(12) United States Patent
Speller et al.

(10) Patent No.: US 8,811,570 B2
(45) Date of Patent: Aug. 19, 2014

(54) TOMOSYNTHESIS APPARATUS AND METHOD

(75) Inventors: Robert Speller, Cheddington Buckinghamshire (GB); Caroline Reid, Berlin (DE)

(73) Assignee: UCL Business PLC, London (GB)

(*) Notice: Subject to any disclaimer, the term of this patent is extended or adjusted under 35 U.S.C. 154(b) by 375 days.

(21) Appl. No.: 13/500,198

(22) PCT Filed: Oct. 8, 2010

(86) PCT No.: PCT/GB2010/051686
§ 371 (c)(1),
(2), (4) Date: May 21, 2012

(87) PCT Pub. No.: WO2011/042750
PCT Pub. Date: Apr. 14, 2011

(65) Prior Publication Data
US 2012/0224666 A1  Sep. 6, 2012

(30) Foreign Application Priority Data
Oct. 9, 2009 (GB) .................................. 0917688.4

(51) Int. Cl.
*G01N 23/04* (2006.01)
*G01T 1/16* (2006.01)
(52) U.S. Cl.
CPC ..................................... *G01T 1/1603* (2013.01)
USPC .............................................. 378/63; 378/21

(58) Field of Classification Search
CPC ...... A61B 6/032; A61B 6/025; G06T 11/006; G01N 23/046; G01N 23/04; G01V 5/0016; G01V 5/0008; G01V 5/005
USPC ...................................... 378/4, 10, 21, 57, 63
See application file for complete search history.

(56) References Cited

U.S. PATENT DOCUMENTS

| 7,319,737 | B2 | 1/2008 | Singh |
| 7,499,522 | B2 | 3/2009 | Chen et al. |
| 2003/0147484 | A1 | 8/2003 | Olshansky et al. |
| 2007/0172129 | A1 | 7/2007 | Tortora et al. |

OTHER PUBLICATIONS

Van de Sompel, Dominique et al. "Systematic Performance Analysis of Sart As Applied to Digital Breast Tomosynthesis", E.A. Krupinski (Ed.): IWDM 2008, LNCS 5116, pp. 561-569, 2008.
Dobbins III, James T., et al. "Digital X-Ray Tomosynthesis: Current State of the Art and Clinical Potential", IOP Publishing Ltd., Published Sep. 16, 2003, Received Apr. 7, 2003, pp. R65-R106.

*Primary Examiner* — Jurie Yun
(74) *Attorney, Agent, or Firm* — Leason Ellis LLP

(57) ABSTRACT

An X-ray inspection system is mounted around conveyor (2). An X-ray source (12) and a number of X-ray detectors record X-ray images of an object (8) such as baggage moving along the conveyor. A visual recordal system (18,22) tracks the motion of the object along the conveyor to identify the location and orientation of the object as it moves along the conveyor. A tomosynthesis image of the object is calculated from the plurality of X-ray images using the location and orientation information from the visual recordal system.

14 Claims, 2 Drawing Sheets

TOMOSYNTHESIS APPARATUS AND METHOD

CROSS REFERENCE TO RELATED APPLICATIONS

This patent application is a National Stage Application under 35 U.S.C. 371 of International PCT Patent Application No. PCT/GB2010/051686, filed on Oct. 8, 2010, which claims the benefit of Great Britain Application Serial No. 0917688.4, filed Oct. 9, 2009, which are hereby incorporated by reference in their entirety herein.

The invention relates to X-ray scanning and in particular to X-ray scanning which uses multiple plane images to generate a three-dimensional representation of an object. The invention may be used in particular in the field of baggage scanning.

Typical baggage scanning of bags at airports uses a primary X-ray scanner located on a baggage transport system that draws baggage through the X-ray scanner continuously. Baggage is scanned by X-ray, essentially scanning a 2 dimensional slice through the baggage. The operator identifies and separates a small percentage of baggage for further secondary scanning and allows the rest to pass through.

Secondary scanning can take place using a number of different technologies. However, typically secondary scanning takes place on single items of baggage that are not on a conveyor, but which may be loaded into a machine and are stationary during secondary inspection. This allows the use of more advanced and accurate inspection techniques at the expense of speed—it is not practicable to check more than a small fraction of baggage in this way.

One method of analysis is a method known as CT scanning (computed tomography), which is used in particular for medical applications. This involves taking a number of two-dimensional sections through the sample through a full 360° from which a three-dimensional representation is calculated. This is typically achieved by rotating an X-ray source and detector around the sample to be imaged while moving the sample linearly along the axis of rotation. The combined motion is therefore helical. Accurate record al of the position of the sample, source and detector is necessary to ensure accurate calculation of the image.

Such CT scanners are large, bulky and extremely expensive. They are as a result generally not preferred for use in baggage scanning. Where they are used, they are used for secondary inspection in view of the low throughput and the need for accurate alignment of the sample and detectors.

One U.S. Pat. No. 7,319,737, suggests the use of a laminographic or tomosynthesis method for baggage scanning. Unlike CT scanning, in which images are taken from essentially all angles, the method known as tomosynthesis takes images from a limited range of angles and calculates a three-dimensional representation from the scans.

A problem not addressed by this patent is however the alignment of the images. Tomosynthesis requires very accurate alignment of the images taken at different angles. If it is intended to take images of a sample at different times, then the motion of the sample needs to be exactly controlled so that the exact motion of the sample between images is known in order to be able to accurately combine the images to build up a three-dimensional representation of the sample.

This means that the system proposed in U.S. Pat. No. 7,319,737 does not appear suitable for use with conventional baggage handling conveyor systems as already installed in airports and similar locations, since the motion of baggage along such conveyor systems is not sufficiently controlled to accurately build up a three-dimensional representation. Instead the system would require a much more accurate conveyor of the type conventionally used in CT scans

SUMMARY OF INVENTION

According to an aspect of the invention there is provided a system according to claim 1.

By combining the visual images and the X-ray images, the visual images can be used to locate exactly the position and orientation of the object to be imaged as it travels along the conveyor. This allows a three-dimensional representation of the X-ray image to be calculated.

According to another aspect of the invention, there is provided a method according to claim 10.

BRIEF DESCRIPTION OF DRAWINGS

Embodiments of the invention will now be described, purely by way of example, with reference to the accompanying drawings, in which.

Figure 1:
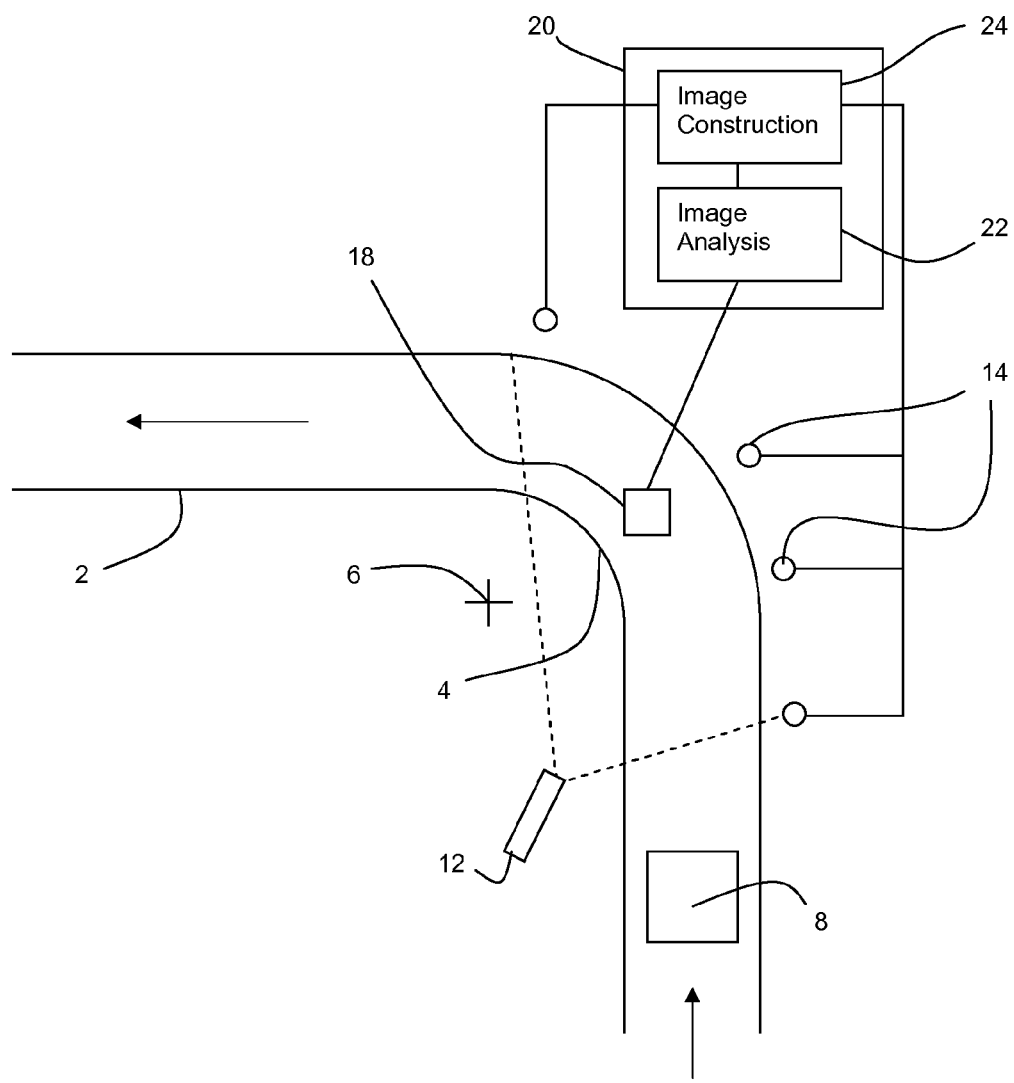
FIG. 1 illustrates a top view of objects moving along the conveyor.

The drawings are schematic and not to scale.

DETAILED DESCRIPTION

A baggage conveyor 2 of the type used to carry baggage 8 in an airport or other facility takes baggage along a predetermined path. Such paths are almost never exactly straight and pre-existing baggage conveyors thus typically include several bends or corners 4.

A baggage inspection system 10 is mounted at a corner 4 along the conveyor. A 90° corner is selected in the embodiment described since such corners frequently occur. Thus, it is generally possible to locate the baggage inspection system 10 around a pre-existing corner in baggage conveyors. However, it is not essential to use a 90° corner—all that is required is that the motion of the baggage around the corner allows a sufficient variety of images to be captured to carry out the method. A 180° corner is particularly suitable, though it occurs less often. The geometric centre 6 of the corner is indicated.

The baggage inspection system 10 includes a wide angle X-ray source 12, i.e. without a collimator, which emits X-rays over a wide angle, preferably at least 40°, or further preferably at least 55°. The source is arranged away from the centre 6 of the bend in the baggage conveyor but on the same side of the conveyor as the centre 6. A plurality of line X-ray detectors 14 are arranged on the opposite side of the conveyor to the X-ray source such that as baggage moves along the conveyor round the corner plane images defined by the X-ray source and the line of each detector are taken as the baggage moves.

As the baggage 8 travels along the conveyor round the corner 4 it will rotate, and so the motion of the baggage is not perfectly defined by the geometry of the conveyor to a level of accuracy sufficient for tomosynthesis.

The baggage inspection system 10 includes a camera 18 mounted above the conveyor to record the motion of baggage along the conveyor.

A controller 20 is connected to the X-ray source 12, X-ray detectors 14 and camera 18. The controller 20 includes an image recognition and analysis module 22 which in combination with camera 18 forms a visual recordal system which determines both the position and orientation of the baggage 8 moving along the conveyor.

The position, i.e. location and orientation, of the baggage is recorded continuously together with the image signal from the camera. An image reconstruction module 24 then constructs a three-dimensional X-ray representation of the baggage.

In the embodiment described, the controller 20 is a computer, with memory and a processor, in combination with code forming the image recognition and analysis module which is arranged to cause the computer to determine the position and orientation of the baggage 8 moving along the controller as well as code forming the reconstruction module 24 to construct the three-dimensional X-ray representation of the baggage.

However, the image recognition and analysis module 22 and the image reconstruction module 24 may both be implemented in hardware or software.

In the embodiment described a sum and add algorithm is used to construct the three-dimensional representation. However, alternative algorithms may be used such as a simulated algebraic reconstruction technique. See for example Dobbins III, J. T., and D. J. Godfrey. "Digital x-ray tomosynthesis: current state of the art and clinical potential." Physics in Medicine and Biology, 2003: R65-R106, and Van de Sompel, D., and M. Brady. "Systematic Performance Analysis of SART as Applied to Digital Breast Tomosynthesis." In Digital Mammography, 561-569. Berlin/Heidelberg: Springer, 2008

Figure 2:
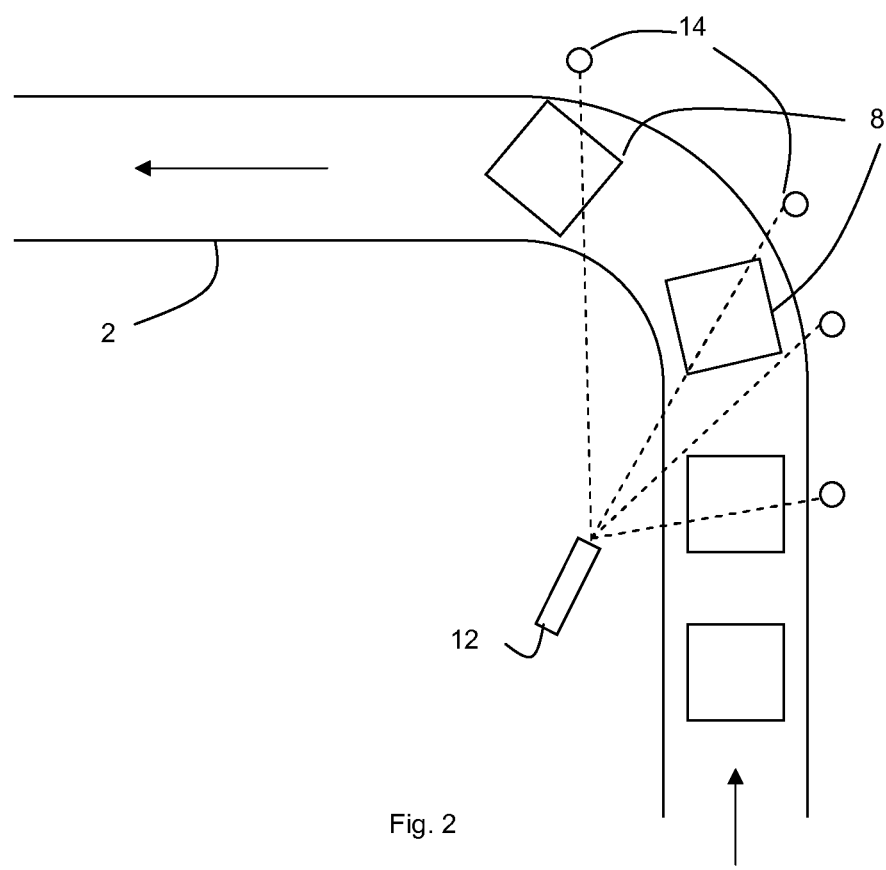
FIG. 2 shows a detail view of baggage moving around a corner of the conveyor.

As the baggage 8 passes through the baggage inspection system 10 images of the baggage are taken at different orientations, with respect to the baggage of at least 20°, preferably at least 40°, as typical baggage moves through the apparatus as illustrated in more detail in FIG. 2. Note that the baggage rotates somewhat as it moves, but because of the off-centre location of the source 12 a variety of images are taken at different angles with respect to the baggage allowing effective construction of the three-dimensional representation to take place.

By providing a visual baggage location system the need to use a specially accurate conveyor is avoided so the system according to the invention can be mounted on existing conveyor systems. This greatly reduces the cost of installing the system.

In a specific implementation, two PaxScan detectors 14 were used as the detectors and a tungsten target X-ray source 12 used as source 12. PaxScan detectors are full two-dimensional detectors.

In an alternative embodiment, multiple cameras 18 are provided.

In some arrangements, it may be possible to use multiple relatively low cost cameras 18, for example web-cameras, and the combined images will allow the image recognition and analysis module 22 to identify the positions of the baggage, especially the edges of the baggage, at least as effectively and in many cases more effectively than using a single higher cost camera.

In particular, multi-station convergent photogrammetry may be used to combine the images from multiple cameras 18 and locate the edges of objects on the conveyor. This can establish real-time tracking of objects to detect differential motion and also register the position and orientation of the objects to accurately define their topography. Even using low-cost cameras, mm scale resolution may be achieved.

Further, the number of detectors that are required may be varied. Since the baggage moves with respect to the detectors, in some cases only one detector may be required, with multiple images captured at different times as the baggage moves through the detectors. Alternatively, multiple detectors may give a greater variety of images and hence improved tomosynthesis reconstruction. The detectors may be line detectors, with a plurality of pixels arranged along a line, the image being built up over time. However, to capture more data for easier image reconstruction, full two-dimensional detectors with a two-dimensional array of pixels are preferred.

Although the embodiments described above relates to an airport baggage conveyor, the invention is not limited to baggage as the object to be detected, but may use any objects that may be placed on a conveyor and imaged. The system may therefore be useful also in industrial applications.

The invention claimed is:

1. An X-ray inspection system for mounting around a conveyor, comprising:
   at least one X-ray source;
   at least one X-ray detector for recording a plurality of X-ray images of an object moving along the conveyor;
   a visual recordal system for tracking the motion of the object along the conveyor and their rotation to identify location and orientation information regarding the location and orientation of the object as it moves along the conveyor; and
   a controller arranged to calculate a tomosynthesis image of the object from the plurality of X-ray images using the location and orientation information from the visual recordal system.

2. The X-ray inspection system according to claim 1, comprising a single X-ray source and a plurality of X-ray detectors.

3. The X-ray inspection system according to claim 2, for use with a substantially horizontal conveyor, wherein the X-ray source is arranged to emit X-rays over an emission angle of at least 45° in the horizontal plane of the conveyor, and the plurality of X-ray detectors are line detectors arranged substantially vertically within the emission angle.

4. The X-ray inspection system according to claim 1, wherein the at least one X-ray detector is a two-dimensional detector.

5. The X-ray inspection system according to claim 4 comprising a plurality of X-ray sources and a plurality of X-ray detectors.

6. The X-ray inspection system according to claim 1 comprising a plurality of X-ray sources and a plurality of X-ray detectors.

7. The X-ray inspection system according to claim 1 wherein the visual recordal system comprises a camera arranged above the conveyor to record images of objects moving along the conveyor.

8. The X-ray inspection system according to claim 1 wherein the visual recordal system comprises a plurality of cameras arranged at different positions around the conveyor to record images of objects moving along the conveyor.

9. The X-ray inspection system according to claim 1, further comprising the conveyor;
   wherein the conveyor extends substantially horizontally and further comprises a corner in the conveyor in the horizontal plane of at least 60°; and
   the at least one X-ray source and the at least one X-ray detector are arranged around the corner.

10. The X-ray inspection system according to claim 9 wherein the X-ray source is mounted at a location spaced from the centre of the corner in the conveyor.

11. The X-ray inspection system according to claim 1, wherein the at least one X-ray detector is a two-dimensional detector.

12. A method of X-ray inspection, comprising:
mounting at least one X-ray source and at least one X-ray detector around a conveyor;
conveying objects along the conveyor past the X-ray source and X-ray detector and recording a plurality of X-ray images as the objects pass the at least one X-ray detector;
tracking the motion of the objects along the conveyor with a visual recognition system;
identifying the location and orientation of the objects as the X-ray images are recorded from information from the visual recognition system; and
calculating a tomosynthesis image of the objects from the plurality of X-ray images using the identified location and orientation information.

13. The method according to claim 12, wherein the step of conveying objects along the conveyor past the X-ray source includes rotating the objects with respect to the X-ray source and X-ray detector as the objects pass the at least one X-ray detector.

14. The method according to claim 12, wherein the conveyor includes a corner, and conveying the objects along the conveyor at the corner causes the objects to rotate with respect to the X-ray source and X-ray detector.

\* \* \* \* \*